L. C. DUNCAN.
AUTOMOBILE BODY.
APPLICATION FILED MAR. 31, 1913.

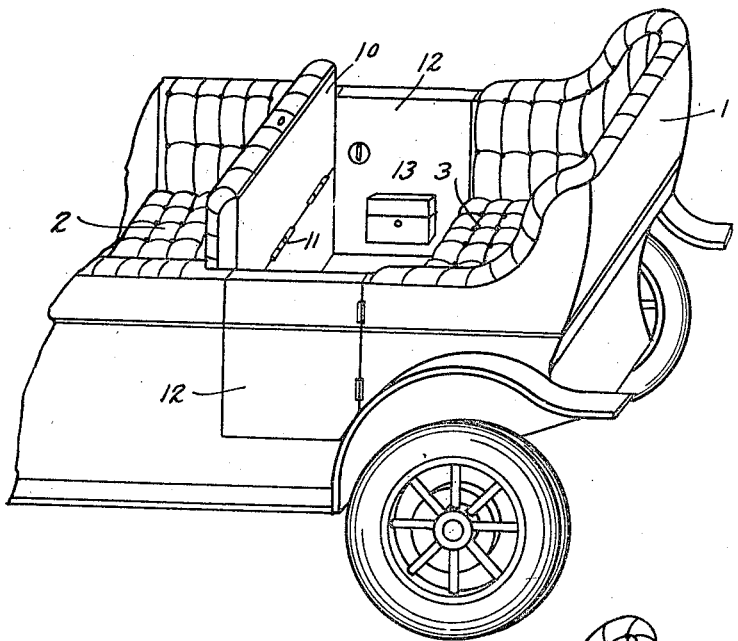
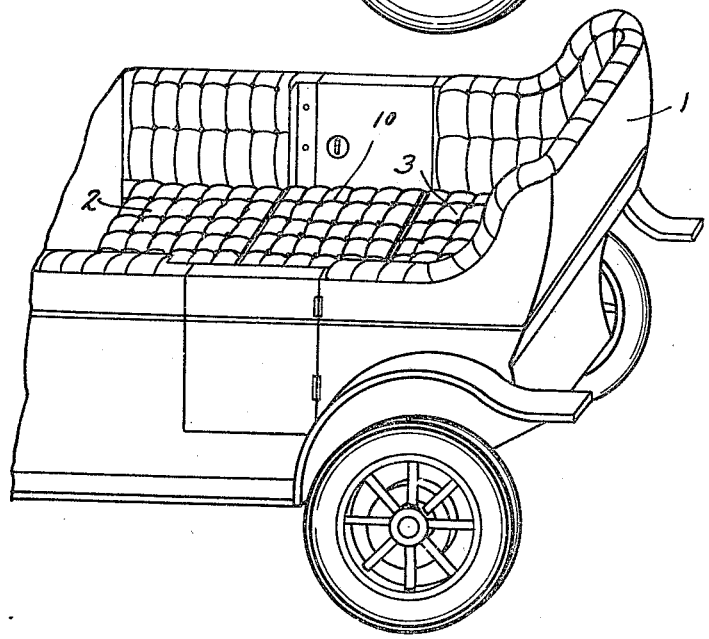

1,139,021.

Patented May 11, 1915.
3 SHEETS—SHEET 2.

Witnesses
Harold Scantlebury
Edna Broyles

Inventor
Lester C. Duncan

By Herbert E. Smith
Attorney

L. C. DUNCAN.
AUTOMOBILE BODY.
APPLICATION FILED MAR. 31, 1913.

1,139,021.

Patented May 11, 1915.
3 SHEETS—SHEET 3.

Witnesses
Edna Broyles
Harold Scantlebury

Inventor
Lester C. Duncan

By Herbert E. Smith
Attorney

UNITED STATES PATENT OFFICE.

LESTER C. DUNCAN, OF LENIA, IDAHO, ASSIGNOR, BY DIRECT AND MESNE ASSIGNMENTS, OF NINE-TENTHS TO CLARENCE F. CAREY, OF SPOKANE, WASHINGTON, AND ONE-TENTH TO V. A. GREENLEAF, OF SEATTLE, WASHINGTON.

AUTOMOBILE-BODY.

1,139,021.    Specification of Letters Patent.   Patented May 11, 1915.

Application filed March 31, 1913. Serial No. 757,752.

*To all whom it may concern:*

Be it known that I, LESTER C. DUNCAN, a citizen of the United States, residing at Lenia, in the county of Bonner and State of Idaho, have invented new and useful Improvements in Automobile-Bodies, of which the following is a specification.

My invention relates to an improved form of automobile body and has as its principal object the provision of an automobile body which may be easily arranged to serve as a bed.

A further object of my invention resides in the particular arrangement and combination of parts hereinafter described.

Figure 3:
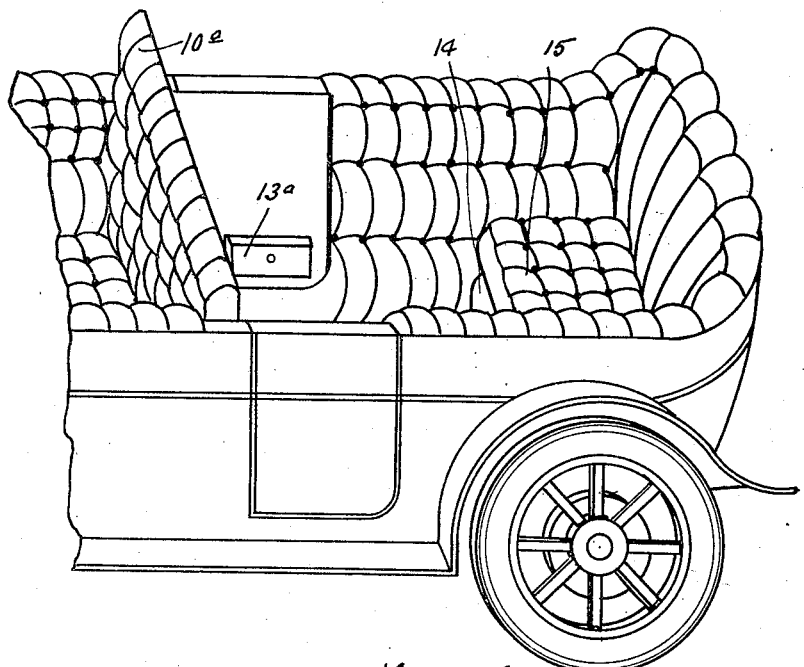
Figure 4:
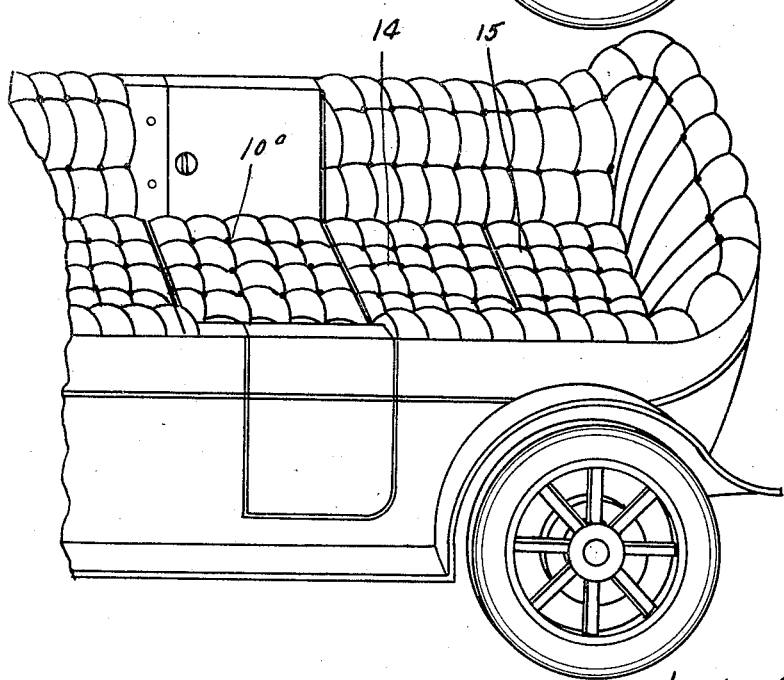
Figure 5:
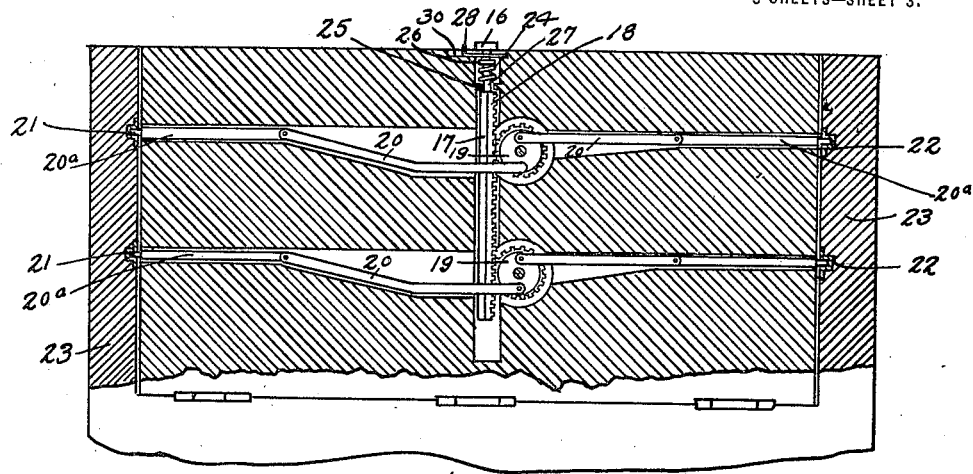
Figure 6:
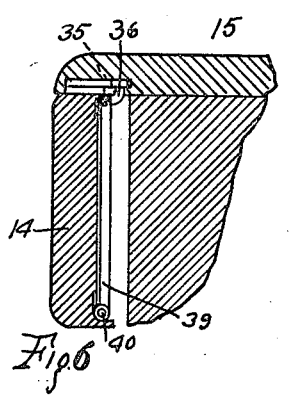
Figure 7:
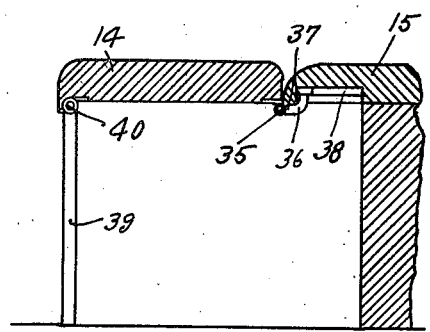
Figure 8:
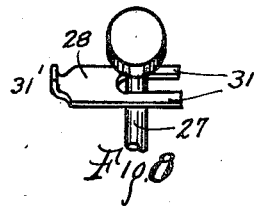

In the accompanying drawings:—Figure 1 is a perspective view of the rear portion of a five passenger automobile, as ordinarily arranged, but having my improvement incorporated therein. Fig. 2 shows the body illustrated in Fig. 1 arranged in position to serve as a bed. Fig. 3 shows the rear portion of a seven passenger touring car in perspective. Fig. 4 is a perspective view of the same body shown in Fig. 3 but arranged according to my invention to serve as a bed. Fig. 5 is a sectional elevation showing the releasing device used in carrying out my invention. Figs. 6 and 7 are detail sectional views showing the arrangement of certain parts used in applying my invention to the body shown in Figs. 3 and 4. Fig. 8 is a detail perspective view used to prevent accidental release of the parts when in normal position.

Throughout the separate views the same part is designated by the same reference character.

Referring more particularly to the drawings, 1 designates the body of an automobile as a whole, said body being provided with rear side doors as shown at 12—12. Said automobile body is also provided with a front cushion 2 and a rear cushion 3. The back of the front seat is indicated at 10. Said back is upholstered in the usual manner but is hinged to the body of the car as shown at 11 instead of being rigid therewith. It will be understood that both of the doors 12 are provided with blocks 13, shown in Fig. 1, and that the top of the blocks 13 are substantially in alinement with the joint between the back 10 and the body of the automobile. Consequently, if the automobile is stalled in the place where there is no access to a house, the back 10 is turned to the rear so as to lie against the upper face of the blocks 13 and the cushion 2 is pushed backward against the forward edge of the back 10 so as to present an unbroken upholstered surface comprising the cushion 2, the upholstering on the back 10, and the rear cushion 3 which may be used for a bed.

In order to hold the back 10 in an upright position when in every day use, I provide the mechanism shown in Fig. 5. As shown in Fig. 5 the back 10 is provided with a central vertical recess in which is an upright member 17 provided with a rack 18. Mounted at one side of the member 18 in suitable recesses in the back 10 are gear wheels 19—19 which mesh with the rack 18. Suitable links such as 20—20 are directly pivoted to the gear wheels 19 and extend outwardly therefrom in opposite directions. Pivoted to the outer ends of the links 20 are horizontal slide rods 20ª which are provided at their outer ends with bolts 21 which normally fit into sockets in the plates 22 which are carried by the side walls 23 of the automobile body. It will be apparent that when the member 17 is pushed downward from the position shown in Fig. 5 that the bolts 21 will be withdrawn from engagement with the plates 22 so that the back 10 may be swung on its hinges 11. In order that the members 17 and connecting mechanism may be held normally in the position shown in Fig. 5, the back 10 is provided with a flange 25 and the upper end of the member 17 is reduced to form a rod 27 on which is a stop 26. Intermediate the stop 26 and the flange 25 and surrounding the rod 27 is a spring 24 which acts upwardly against the stop 26 so as to hold the member 17 in the position shown in Fig. 5. A head 16 is provided on the rod 27 which projects above the upper edge of the back 10 so that the releasing mechanism may be operated when desired. In order to prevent accidental operation of the releasing mechanism I provide a slotted slide member 28, best shown in Fig. 8. Slide member 28 is seated in a socket 30 in the upper edge of the back 10 and the prongs 31 of the member 28 normally embrace the rod 27 so that it is impossible to force down the head 16 sufficiently to release bolts 21 until the member 28 has been drawn to the left from the position shown in Fig. 5. The member 28 is provided with an upstanding clip 31' which projects above the edge of the back 10 so that it may be readily grasped in order to operate the member 28 when it is desired to fold back the member 10.

Referring more particularly to Figs. 4, 5, 6 and 7, it will be understood that in case of a seven passenger automobile I provide a back 10$^a$ and blocks 13$^a$ identical with the back 10 and blocks 13 of the modification shown in Figs. 1 and 2. It will be understood, however, that in case of a seven passenger automobile there is more room provided between the front seat and the rear, and that two removable seats are usually placed in this space. In order to use such automobile as a bed these removable seats must be taken out and I have provided special means for filling this space made by the removal of said seats. It will be seen that in Figs. 3 and 4 the rear seat is numbered 15. At the forward edge of said seat 15 I provide an upholstered member 14 which normally hangs downwardly as shown in Fig. 6. The member 14 is pivoted at 35 to a curved bracket 36 and the bracket 36 is supported by a block 37 which is slidably mounted in a slot 38 on the underside of the seat 15. The member 14 is also provided with a pair of legs 39 which are pivoted to part 14 as shown at 40, at the edge removed from the pivot 35. The face of the member 14 which carries the pivot 40 is recessed so that legs 39 may fold against said face so that they will be entirely out of the way when the cushion 14 is lowered.

In view of the foregoing it will be seen that in order to prepare the body shown in Figs. 3 and 4 for use as a bed, the removable seats must first be taken out, the back of the front seat must be folded backward, the cushion 14 must be swung up to take the place of the seats which have been removed, and the legs 39 must be turned down so as to support the cushion 14.

It will be understood that while I have shown and described the preferred form of my invention, changes and modifications thereof may be made without departing from the spirit thereof, and that parts of my invention may be used without utilizing the whole.

Having thus described my invention, what I claim is:—

1. An automobile body comprising in combination, a seat having a back, hinges connecting said back with the body, and locking mechanism mounted on said back and adapted to hold said back normally in a vertical position, said mechanism comprising one or more bolt members, means pivoted to said bolt members, a gear wheel pivoted to said link, a rack meshing with said gear wheel, a fixed abutment projecting from said back, a stop carried by said rack, and a spring intermediate said abutment in said stop adapted to hold said mechanism in a locking position.

2. An automobile body comprising in combination, a seat having a back, hinges connecting said back with the body, and locking mechanism mounted on said back and adapted to hold said back normally in a vertical position, said mechanism comprising one or more bolt members, means pivoted to said bolt members, a gear wheel pivoted to said link, a rack meshing with said gear wheel, a fixed abutment projecting from said back, a stop carried by said rack, a spring intermediate said abutment in said stop adapted to hold said mechanism in a locking position, means whereby said rack may be operated to release said locking members, and a stop adapted to prevent the accidental operation of said rack.

3. An automobile seat comprising in combination, a fixed horizontal portion provided with a slot near one edge thereof, blocks slidably mounted in said slot, curved brackets rigid with said blocks, hinges carried at one end of said brackets, a movable portion supported by said hinges, said portion being normally in a vertical position but said hinges being adapted to permit it to assume a horizontal position in substantially the same plane as said fixed portion, and means for supporting said movable portion in a horizontal position.

4. An automobile body comprising in combination, a front seat, a back for said front seat hinged to the body, means for normally locking said back in an upright position, rear doors hinged to the body and blocks carried by said doors adapted to support said back in a horizontal position.

5. The combination of an automobile body, two seats carried by said body and spaced apart, doors hinged to said body and opening from spaces between said seats, and blocks attached to the inner sides of said doors, the forward one of said seats being provided with a back adapted to swing rearwardly and rest on said blocks.

In testimony whereof I affix my signature in the presence of two witnesses.

LESTER C. DUNCAN.

Witnesses:
HAROLD SCANTLEBURY,
EDNA BROYLES.